United States Patent
de Groote

(10) Patent No.: US 6,793,193 B2
(45) Date of Patent: Sep. 21, 2004

(54) ADJUSTABLE MOLD FOR FORMING SHAPED FOOD

(75) Inventor: Jan-Hendrik de Groote, Brussels (BE)

(73) Assignee: Dart Industries Inc., Orlando, FL (US)

( * ) Notice: Subject to any disclaimer, the term of this patent is extended or adjusted under 35 U.S.C. 154(b) by 171 days.

(21) Appl. No.: 10/224,143

(22) Filed: Aug. 20, 2002

(65) Prior Publication Data

US 2004/0036004 A1 Feb. 26, 2004

(51) Int. Cl.[7] .................................................. A21B 5/02

(52) U.S. Cl. ................... 249/119; 249/155; 249/157; 425/DIG. 44; 426/512; 99/426

(58) Field of Search ................................ 249/119, 155, 249/157; 425/DIG. 44; 426/512; 99/426

(56) References Cited

U.S. PATENT DOCUMENTS

| | | | |
|---|---|---|---|
| 3,483,908 A | * 12/1969 | Donovan | ..................... 221/260 |
| 3,958,504 A | 5/1976 | Levin | |
| D274,781 S | 7/1984 | Baker et al. | |
| 4,598,839 A | 7/1986 | Dombroski et al. | |
| 6,231,910 B1 | 5/2001 | Ellingsworth | ................ 426/505 |
| D457,031 S | 5/2002 | Wallays et al. | .............. D7/357 |

* cited by examiner

Primary Examiner—Robert Davis
Assistant Examiner—Donald Heckenberg

(57) ABSTRACT

A food mold including one or more molding pockets, at least one of which includes a primary molding chamber and a secondary molding chamber pivotally or flexibly joined to the primary chamber for selective positioning of the secondary chamber in communication and alignment with the primary chamber to define a first mold configuration, and a second position wherein the secondary chamber is inverted into the primary chamber to define a second mold configuration substantially smaller than the first mold configuration.

20 Claims, 5 Drawing Sheets

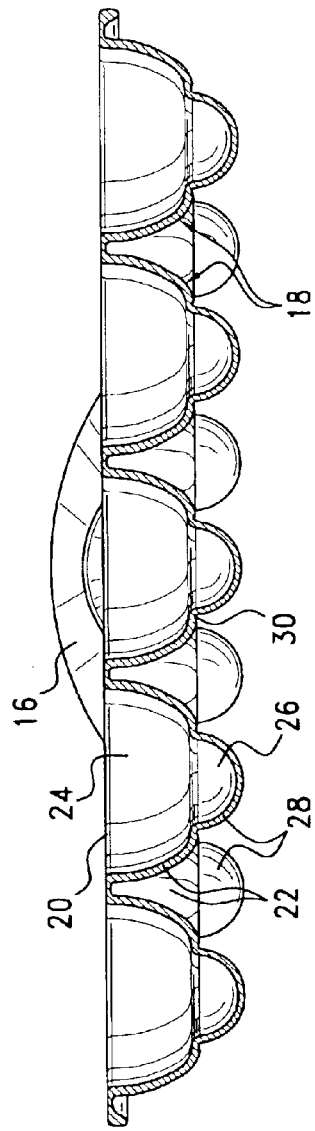
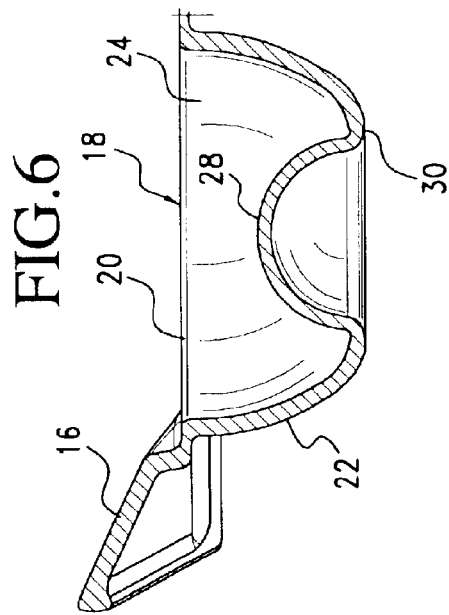
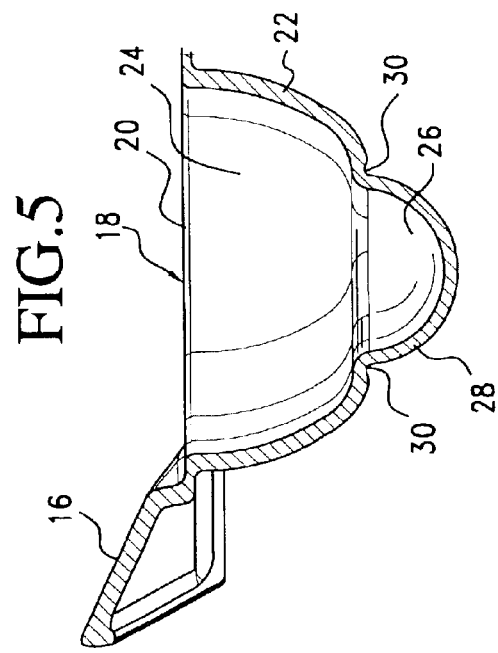

ADJUSTABLE MOLD FOR FORMING SHAPED FOOD

BACKGROUND OF THE INVENTION

The molding of foodstuffs into shaped foods, particularly as practiced in the home, has commonly involved the use of trays or pans formed to provide the desired final shape, whether the molded food be chocolates or similar confectioneries, cakes, muffins, cupcakes, gelatins, and the like. While generally referred to as baking trays or pans, it will be appreciated that, depending upon the nature of the food to be formed, no actual "baking" may be involved. For example, only a "cooling" or "waiting" period may be required, as for example in the use of gelatin molds.

Such molds are usually rigid although molds of an elastomeric silicone material, incorporating a degree of flexibility, are also known.

Known food molds are, other than for variations in shape, of a basically simple construction having a fixed size molding chamber or chambers which can be used to repeatedly produce foods which in external appearance duplicate each other. If variety in shape is desired, one must have access to a plurality of separate differently shaped molds or mold trays. Other than by the use of different molds, no practical provision for variety in shape has heretofore been available.

SUMMARY OF THE INVENTION

It is a primary object of the present invention to provide for the molding of foodstuffs into more than one configuration or shape without the necessity of utilizing multiple molds or, in other words, a different mold for each shape.

In furtherance thereof, it is a principal object of the invention to provide a food mold which incorporates, in one or more mold pockets, an integral adjustable component which allows for a variation in the mold shape, and hence in the shape of the formed food without requiring use of a separate mold.

It is also of significance that the food mold be of a unitary construction, preferably of a material having some elastomeric properties, such as an appropriate silicone, wherein the mold pocket or pockets are integrally formed and require no additional components, inserts, or the like, to achieve the desired variation in the shape of the food products formed.

In achieving the objects of the invention, each or selected ones of the food molding pockets into which the basic foodstuffs are to be introduced, normally by pouring, includes, remote from the open end thereof, an inner chamber section which is slightly smaller in transverse cross section than an aligned chamber section outward thereof. The smaller inner section is specifically formed to allow for a selective inward inverting into the larger outer section. This is done utilizing a flexible interconnection between the sections which is preferably formed by a slight weakness at the juncture between the integrally joined walls of the inner and outer sections.

Upon inverting of this inner section, there is both a reduction in the receiving volume of the chamber and the formation of a corresponding recess in the outer end of the formed food which appears when the food is removed from the mold. As such, the shape and appearance of this food product will be distinctly different from that of a food product formed by the mold with the inner portion or section thereof fully extended, that is not inverted.

Further objects, advantages and goals of the invention, and variations within the basic concepts of the invention will be noted as the details of the invention are more fully hereinafter described.

BRIEF DESCRIPTION OF THE DRAWINGS

Attention is now directed to the drawings wherein like reference numerals refer to like parts throughout the several views and wherein:

FIG. 4 is a transverse cross-sectional view taken substantially on a plane passing along line 4—4 in FIG. 3;

FIG. 5 is an enlarged cross-sectional detail taken substantially on a plane passing along line 5—5 in FIG. 3 and illustrating a typical mold pocket or chamber with the lower or innermost section extended;

FIG. 6 is a cross-sectional detail similar to FIG. 5 with the movable section inverted into the upper or outer section;

DESCRIPTION OF PREFERRED EMBODIMENTS

Figure 1:
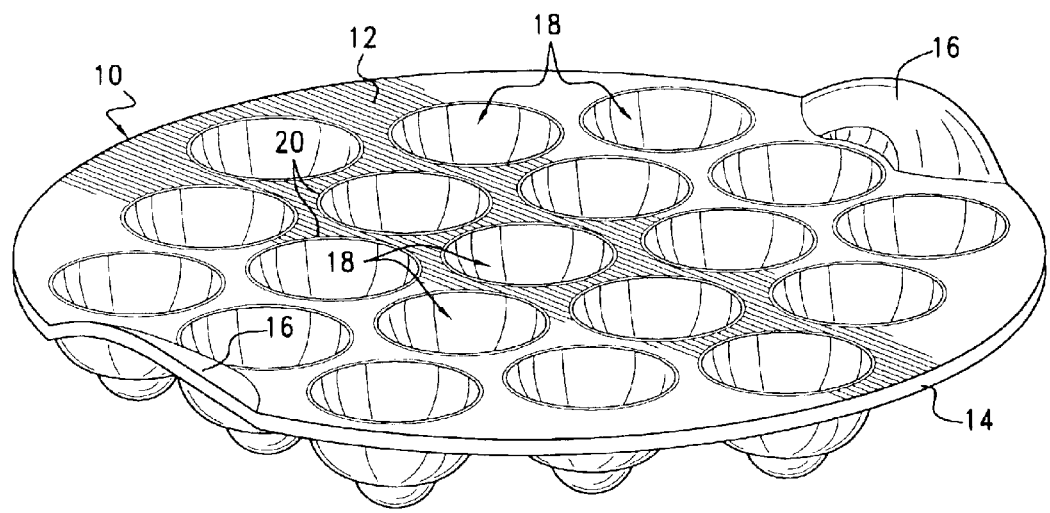
FIG. 1 is a top perspective view of one embodiment of the invention in position to receive poured foodstuff to be formed.
Figure 2:
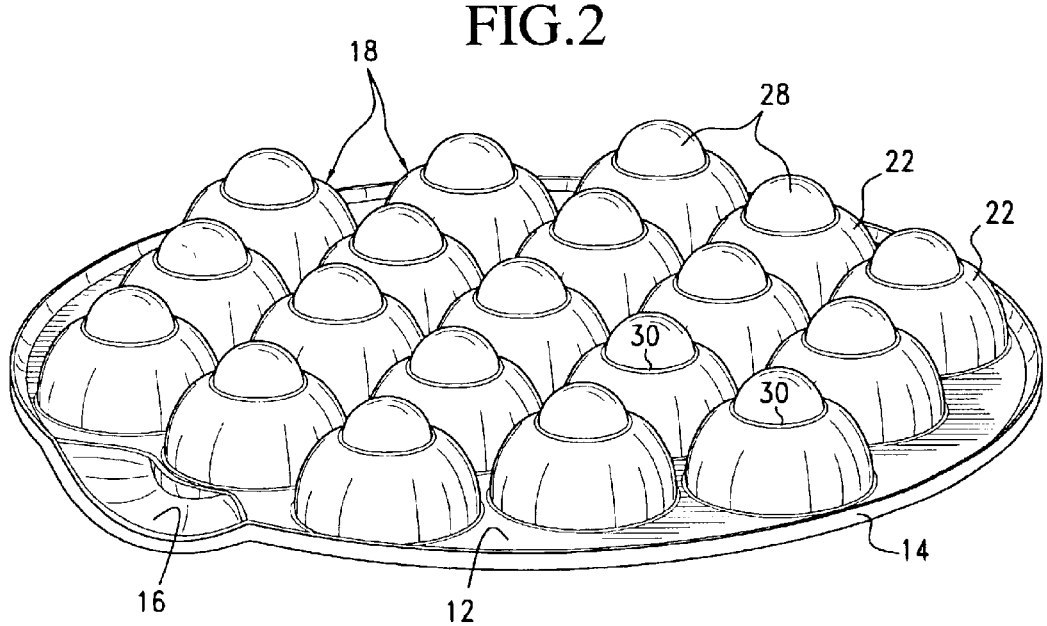
FIG. 2 is a bottom perspective view wherein the mold is in position for removal of the formed foods.
Figure 3:
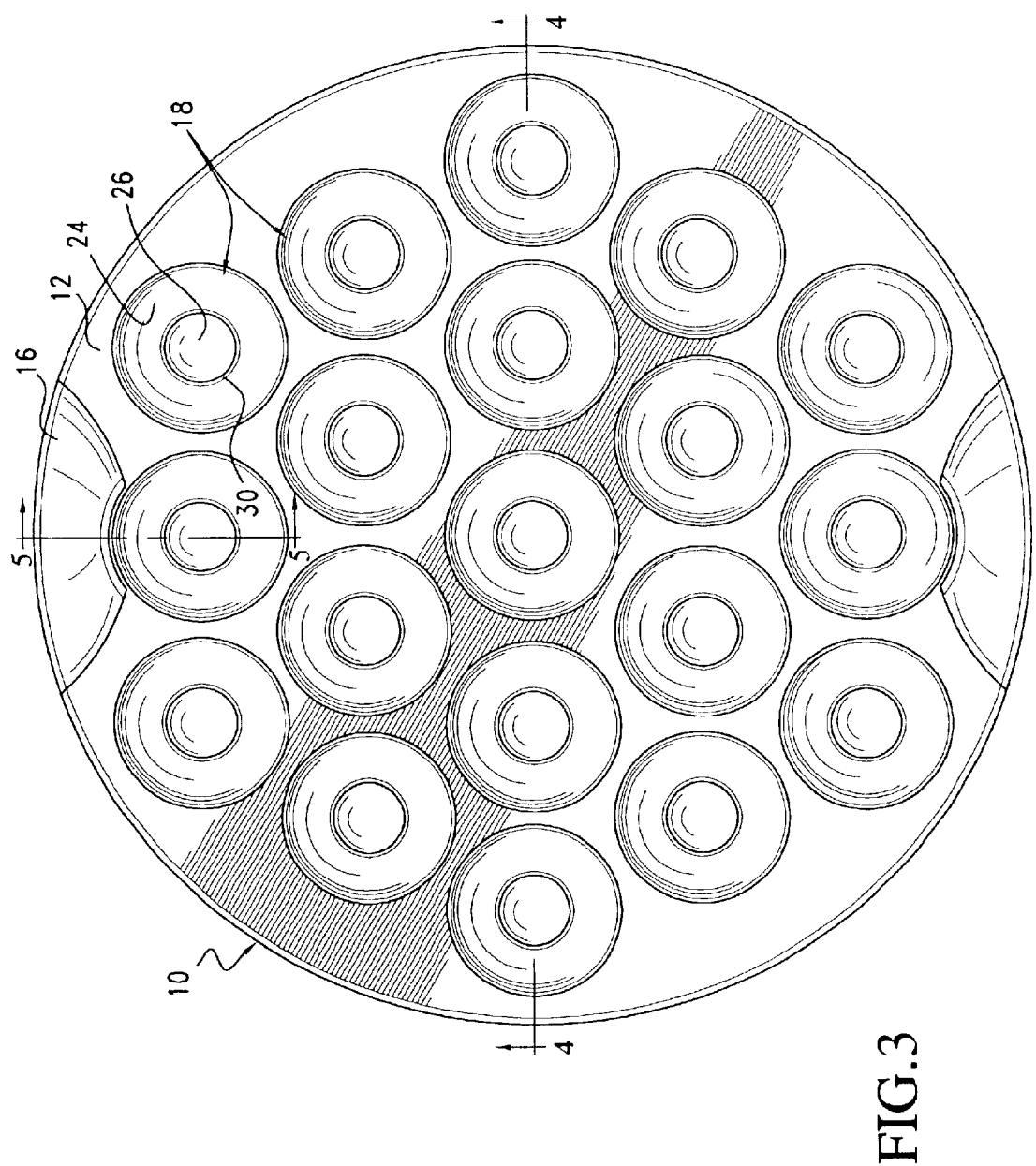
FIG. 3 is a top plan view of the mold.

Referring now more specifically to the drawings, and in particular FIGS. 1–3, a preferred embodiment of the invention comprises a one-piece tray mold 10 including a planar tray body 12 with an annular depending reinforcing lip 14 and diametrically opposed upwardly arcing handles or handle portions 16. Multiple molding pockets or compartments 18, integral with the body 12, depend therefrom and open upwardly therethrough.

In the illustrated example of the tray 10, noting in particular the top plan view of FIG. 3, the pockets are arranged in three concentric rows about a central pocket with the rows rotationally offset from each other to provide a maximum utilization of the area of the tray. The relatively small size of the pockets 18, with the upwardly opening mouth of each pocket being approximately 35 mm in diameter, would particularly adapt this mold 10 for the forming of confectioneries such as chocolate candies. As will be appreciated, this is but one example of the many foods which can be formed or molded with the actual size and configuration of the pocket or pockets depending upon the final product desired.

With reference to the bottom perspective view of FIG. 2 and with particular attention directed to the cross-sectional details of FIGS. 4 and 5, it will be seen that all of the pockets 18 in this illustrated embodiment are of the same configuration. Each pocket 18 includes, with the tray positioned for the reception of a moldable foodstuff, an open upwardly directed receiving end or mouth 20 defined by a primary peripheral wall 22, preferably downwardly and inwardly tapered or arcing to facilitate removal of the molded food product. This wall 22 forms an upper pocket section which defines an upper primary molding chamber 24. The primary chamber 24 directly communicates with an underlying smaller secondary chamber 26 in a lower pocket section defined by a secondary peripheral wall 28 and forms a continuous maximum molding volume or configuration therewith. The wall 28 and lower section formed thereby are preferably hemispherical and includes a closed bottom and a peripheral edge integrally joined to the lower edge of the peripheral wall 22 of the primary chamber 24 along a peripheral integral hinge line 30 formed by a slight narrowing of the thickness of the integral walls 22 and 28. This allows for a pivot action between the upper and lower sections of the pocket defined by the primary and secondary walls. While not limited thereto, as illustrated the lower pocket section and chamber are preferably centrally located below the primary chamber and approximately one-half the transverse width thereof. The height of the lower secondary chamber is approximately one-half the height of the upper primary chamber.

Chocolate candies or other confectionaries formed within the pocket defining chambers as thus far described will correspond in shape to the pockets as illustrated in the bottom perspective view of FIG. 2 with an enlarged upwardly tapering lower body portion and a reduced diameter domed tip thereon. This is a particularly pleasing configuration which, as desired, could allow for a two step molding process providing for variations in color, texture or the like, between the domed tip and the relatively larger base.

The most significant aspect of the present invention is the capability of varying the configuration of the basic pocket by uniquely providing for the repositioning of the domed tip of the pocket defining the smaller secondary chamber 26. Noting FIG. 6 in particular, it will be seen that this domed lower section, through the integral hinged joinder area 30 between and at the intersection of the upper and lower sections, is capable of being upwardly inverted into the larger upper primary chamber 24. The lower tip section, upon being physically upwardly inverted, snaps into its new inverted position. As will be appreciated, in order to allow for this inverting action, at least the tip section will be of an appropriate elastomeric nature. In this regard, it is contemplated that, in a preferred embodiment, the entire tray or pan will be formed of an appropriate food compatible silicone with the thickness of the secondary wall 28, which defines the secondary chamber 26, being slightly thinner than the thickness of the peripheral wall 22 which defines the primary chamber 24. This variation in wall thickness, along with the provision of a "narrow" hinge line 30 is significant in facilitating the inverting movement.

Figure 7:
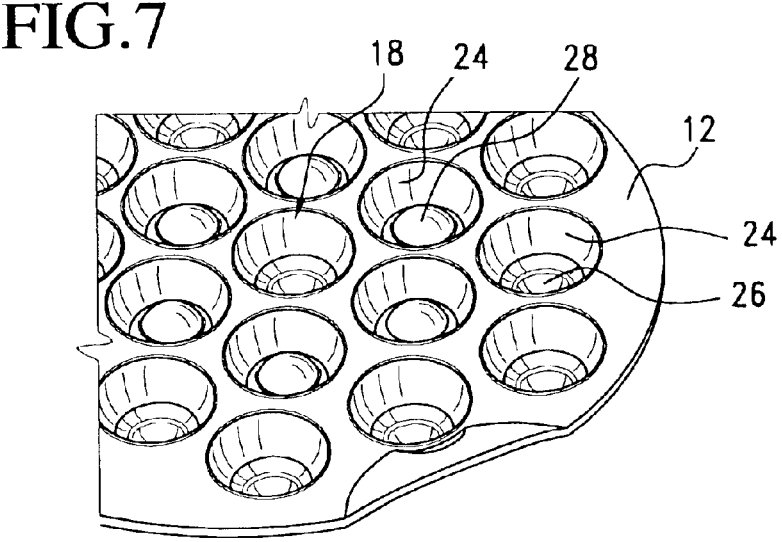
FIG. 7 is a partial top perspective view similar to FIG. 1 wherein selected pockets have the inner adjustable section inverted, thus providing for the formation of two distinctive food shapes utilizing duplicately constructed mold pockets.

The confectionary or other food product formed within the pocket with the inverted lower section will be defined with an upwardly opening recess therein usable as a small receptacle for an additional foodstuff such as a piece of fruit, berries, a filling such as whipped cream, and the like. Thus, utilizing a single unitary pocket construction, two distinctly different food shapes can be formed. In this regard, and noting the bottom perspective detail of FIG. 7, by inverting the lower chamber forming sections on only selected pockets, two distinct food product shapes can be simultaneously formed utilizing a tray with duplicate pockets.

Figure 8:
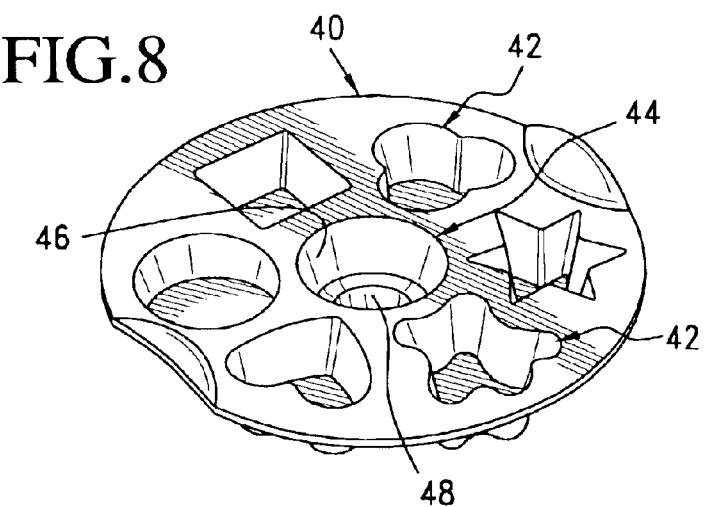
FIG. 8 is a top perspective view of another mold form, for example a muffin or cupcake pan, wherein only the central pocket is variable with a selective invertible inner section.
Figure 9:
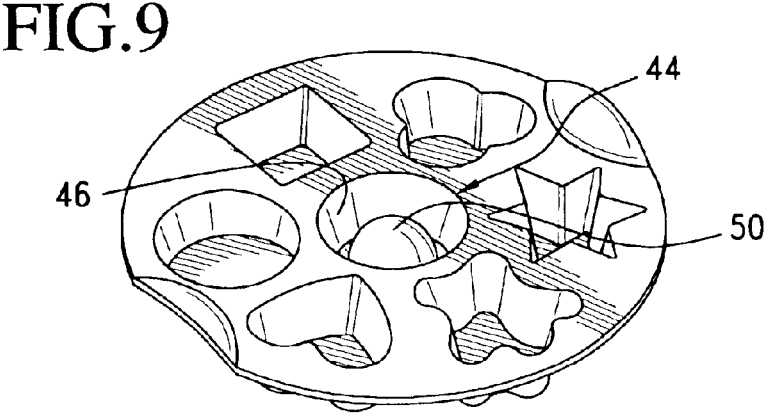
FIG. 9 is a perspective view similar to FIG. 8 with the lower domed section of the central pocket inverted.
Figure 10:
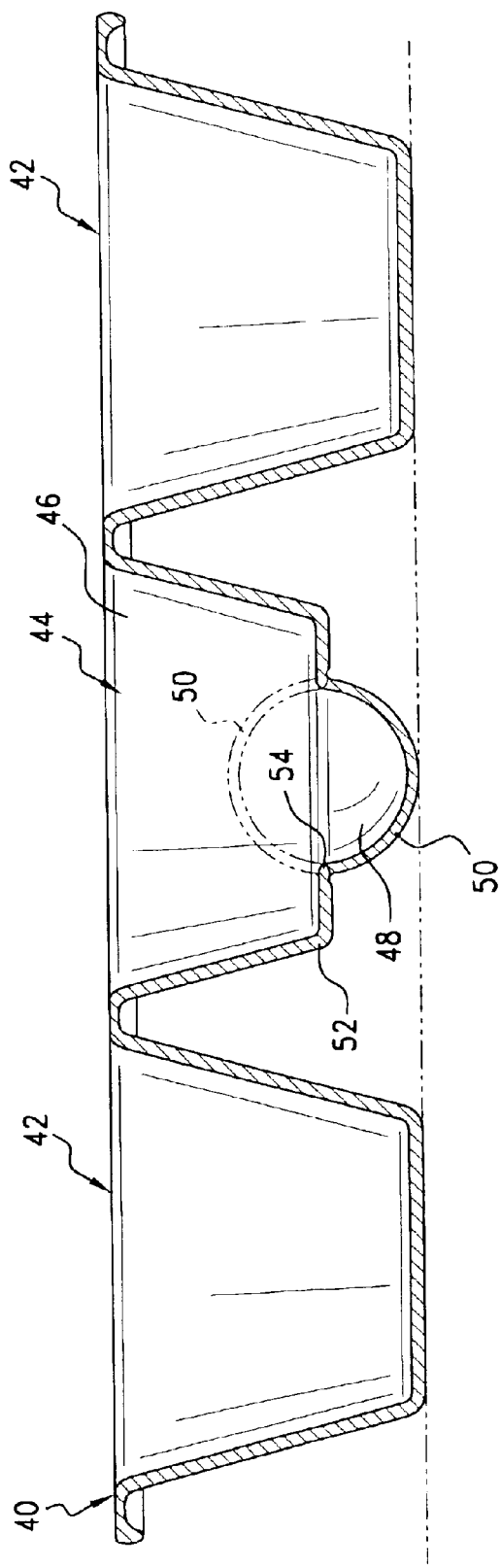
FIG. 10 is an enlarged cross-sectional detail diametrically across the form of FIG. 8 with the lower adjustable section illustrated in full lines in its extended position and in phantom lines in its inverted position.

Referring now specifically to FIGS. 8, 9 and 10, another form of tray 40 is illustrated therein. This tray 40, also preferably made as a one-piece unit of an appropriate food compatible elastomeric material such as silicone, includes a smaller number of larger compartments or pockets 42 of different fixed configurations in conjunction with at least one pocket 44 including the desired adjustability previously described. FIGS. 8 and 9 illustrate a few of the many configurations the molding chambers can take, each normally with a slightly downward tapering configuration for ease of removal of the molded product.

Noting the cross-sectional view of FIG. 10, pocket 44 will, as with the first described pockets, include an upper enlarged primary chamber 46 and a directly communicating smaller depending secondary chamber 48. The peripheral wall 50 of the secondary chamber may define a hemispherical inverted dome, as in the first described embodiment, or any other easily invertible configuration such as an inverted truncated pyramid a cube, and the like, primarily determined by the nature of the top recess desired in the molded food product. The elastomeric wall 50 of the secondary chamber and the wall 52 of the primary chamber have a flexing joinder 54 therebetween which allows, upon a slight collapsing of the lower chamber, an upward inserting into the upper primary chamber as illustrated in phantom lines in FIG. 10.

With continued reference to FIG. 10, the lower extremity of the wall 50 defining the lower chamber of pocket 44 is preferably coplanar with the lower ends of the remaining pockets 42 to maximize the supporting base for the mold or form 40. However, even with the lower chamber wall 50 upwardly inverted into the interior of the upper chamber, sufficient stability is provided by the surrounding pockets or compartments 42 to maintain the central pocket 44 out of supporting contact with the underlying surface. FIG. 9 illustrates, from a top perspective, the tray 40 with the central pocket 44 adjusted by the upwardly projected lower compartment wall 50. Incidentally, the central positioning of this adjustable pocket 44 is of value in that the interior volume of the pocket 44 is reduced by approximately 30%. This in turn tends to compensate for the "cool spot" in the center of most microwave ovens. In regard thereto, it is particularly intended that the elastomeric material of the forming unit, whether a forming tray, a baking pan, or other form of mold, be equally adapted for use in a conventional oven, microwave oven and refrigerator. A food compatible silicone has been found to be particularly adapted for this purpose.

While FIGS. 8, 9 and 10 illustrate a mold with several fixed compartments and only a single adjustable compartment, it will be readily appreciated that any number of combinations of fixed and adjustable compartments can be provided, requiring only a stable base for the mold in any of its adjusted positions. Similarly, while only multiple compartment or pocket molds have been illustrated, such being particularly desirable for allowing the simultaneous forming of multiple food products, the present invention also contemplates a food mold or form comprising a single compartment with an upper primary chamber and a lower smaller secondary chamber selectively upwardly inverted into the upper chamber. Such a mold would be more practical in the formation of larger foods or food products such as cakes, molded gelatin deserts, and similar items.

Another variation, which would find particular practicability with larger molding compartments, would include the provision of more than one invertible secondary chamber in order to selectively produce multiple receiving recesses or depressions on the exterior of the formed product.

The foregoing is considered illustrative of the principles of the invention. While preferred embodiments have been set forth in detail, it will be appreciated that based on the teachings herein, those skilled in the art will recognize modifications and additional embodiments which can be realized within the scope of the invention. It is not desired to limit the invention to the exact construction and manner of use shown and described. Rather, all suitable modifications and equivalents may be resorted to as falling within the scope of the invention.

What is claimed is:

1. A food mold for the molding of foodstuff into a shaped food, said mold comprising a body of a food compatible material, said body defining at least one adjustable mold compartment therein, said mold compartment having an open upper receiving end for reception of shapable foodstuff into said compartment, said compartment including a first peripheral wall defining a first upper section extending downward from said receiving end and forming a primary molding chamber, and a second peripheral wall defining a second lower section forming a secondary molding chamber with a closed bottom; said wall of said lower section being joined to said wall of said upper section with a foldable area defined therebetween, said lower section and secondary chamber being selectively invertible between a first extended position aligned with and depending below said primary chamber, and a second adjusted position upwardly inverted about said foldable area and into said primary chamber, whereby two distinct molded configurations are provided, a first configuration wherein said primary chamber and said secondary chamber, in said first extended position, provide an extended continuous defined shape, and a second configuration wherein said primary chamber and said secondary chamber, in said second adjusted position, provide a defined shape approximating the primary chamber reduced by the inverted secondary chamber therein.

2. The food mold of claim 1 wherein said body is of a unitary construction with the walls of the first and second chambers being integral.

3. The food mold of claim 2 wherein said body is of an elastomeric material, said first peripheral wall being of a predetermined thickness, said second peripheral wall being of a lesser thickness.

4. The food mold of claim 3 wherein said body defines a plurality of adjustable mold compartments, each having a first primary chamber and a second smaller secondary chamber selectively movable between a first position aligned with and extending beyond said primary chamber, and a second position inverted into said primary chamber.

5. The food mold of claim 3 wherein said body defines at least one fixed shape molding compartment in addition to said at least one adjustable mold compartment.

6. The food mold of claim 1 wherein said body defines a plurality of adjustable mold compartments, each having a first primary chamber and a second smaller secondary chamber selectively movable between a first position aligned with and extending beyond said primary chamber, and a second position inverted into said primary chamber.

7. The food mold of claim 6 wherein said primary chamber of each adjustable compartment is of a predetermined size and transverse dimension, and said secondary chamber of each adjustable compartment is of a transverse dimension substantially less than the transverse dimension of the associated primary chamber for selective reception therein in inwardly spaced relation to the peripheral wall defining the primary molding chamber.

8. The food mold of claim 7 wherein each secondary chamber is of a generally hemispherical configuration.

9. The food mold of claim 1 wherein said primary molding chamber is of a downwardly tapering configuration and of a predetermined transverse size adjacent the foldable area, said secondary chamber being of a dome configuration and of a transverse size no greater than that of said predetermined size of the primary chamber at this joinder.

10. An adjustable mold for forming shaped food products, said mold comprising an adjustable pocket with first and second peripheral walls, said first peripheral wall defining a first molding chamber with a first open end and a second end remote therefrom, said second peripheral wall defining a second molding chamber with a first closed end and a second end remote therefrom, said walls at said second ends of said chambers being pivotally joined at a juncture therebetween for selective adjustment of said second molding chamber between a first position aligned with said first molding chamber and extending therefrom to define a continuous molding volume, and a second position inverted into said first molding chamber, whereby two distinct mold configurations are selectively defined.

11. The adjustable mold of claim 10 wherein said peripheral walls, at said second ends, are integral with the juncture therebetween being flexible.

12. The adjustable mold of claim 11 wherein said mold is of a unitary construction formed of an elastomeric material.

13. The adjustable mold of claim 12 wherein said mold comprises a plurality of pockets, each similarly defined with a first molding chamber and a second molding chamber joined to the first chamber and selectively invertible into the corresponding first chamber.

14. The adjustable mold of claim 10 including a plurality of additional pockets each forming a single chamber of a fixed configuration.

15. The adjustable mold of claim 14 wherein the first peripheral wall defining said first molding chamber progressively narrows from said first open end thereof to a minimum transverse width at said second end thereof, said second peripheral wall defining said second molding chamber being of a transverse width at the second end thereof no greater than the minimum transverse width of said first molding chamber, said second peripheral wall progressively narrowing from said second end thereof to said closed end.

16. The adjustable mold of claim 15 wherein said adjustable pocket is located centrally of said fixed configuration pockets and, with said second molding chamber in said first position thereof, defining a common base line with the fixed configuration pockets.

17. In a food mold for forming shaped food products, a primary food forming chamber and a secondary food forming chamber extending from and defining an aligned extension of said primary chamber, the aligned chambers combining to form a single continuous mold volume for the molding of a food product corresponding in shape to said primary chamber and said extending secondary chamber, and pivot means joining said secondary chamber to said primary chamber for selective movement of said extending secondary chamber inwardly upon itself and into said primary chamber to enable the molding of a shaped food product defined principally by said primary chamber reduced by the secondary chamber therein.

18. The food mold of claim 17 including a mold body with at least one pocket integrally formed therefrom and projecting therefrom, said primary and secondary chambers being defined by and in said pocket.

19. The food mold of claim 18 including multiple substantially duplicate pockets, each including a primary chamber and an aligned secondary chamber selectively movable between an extending position relative to the primary chamber and an inverted position received within the primary chamber.

20. The food mold of claim 19 wherein said mold and said pockets formed therefrom are a unitary structure and of an elastomeric food compatible material.

* * * * *